Aug. 13, 1946.    P. L. HAAGER    2,405,745
BEARING MOUNTING
Filed Dec. 4, 1944    2 Sheets-Sheet 1

Aug. 13, 1946.  P. L. HAAGER  2,405,745
BEARING MOUNTING
Filed Dec. 4, 1944  2 Sheets-Sheet 2

INVENTOR:
Paul L. Haager
by Lauren & Gravely
HIS ATTORNEYS.

Patented Aug. 13, 1946

2,405,745

UNITED STATES PATENT OFFICE 2,405,745

BEARING MOUNTING

Paul L. Haager, Canton, Ohio, assignor to The Timken Roller Bearing Company, Canton, Ohio, a corporation of Ohio Application December 4, 1944, Serial No. 566,436

11 Claims. (Cl. 308—207)

1

This invention relates to bearing mountings, particularly roller bearing mountings for the necks of the rolls of rolling mills.

The principal object of the present invention is to devise a roller bearing mounting of the above type that can be readily mounted in and removed from the windows of existing roll housings; that will accommodate the load occasioned by the rolling operation without sacrificing the strength of the roll neck; and that will permit ready removal and replacement of the outer raceway members for the bearings in the bearing boxes. The invention consists in the roll neck roller bearing mounting and in the parts and combinations and arrangements of parts hereinafter described and claimed.

Figure 2:
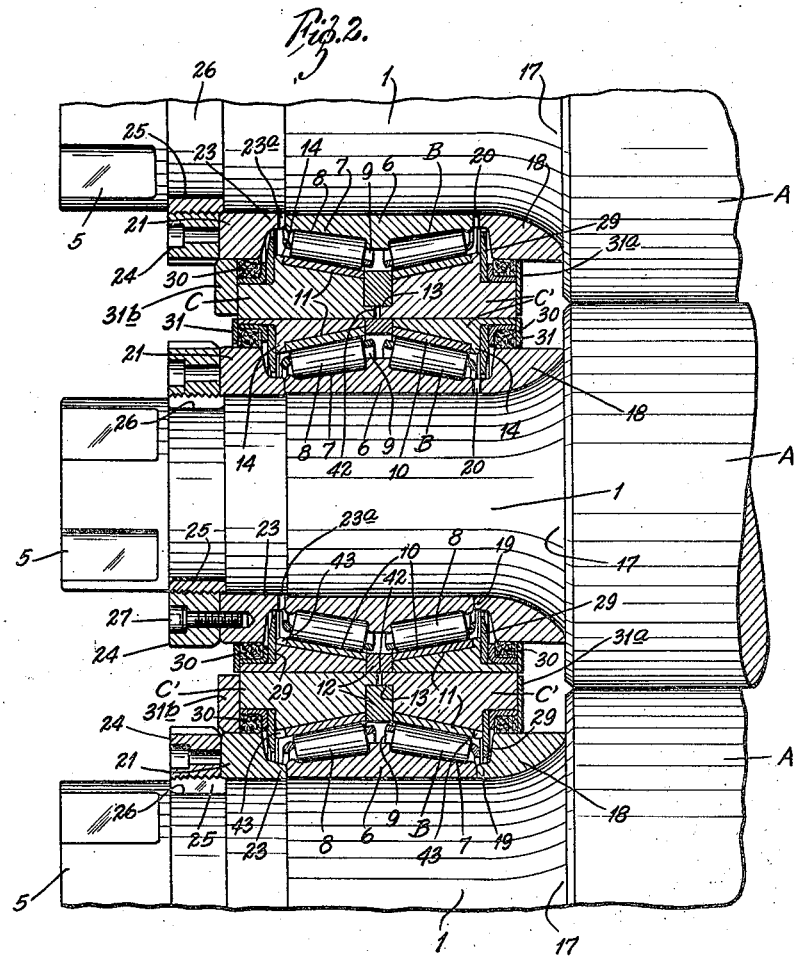
Figure 4:
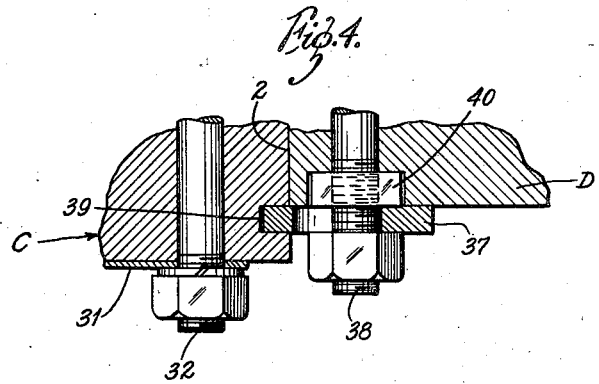

In the accompanying drawings, which form part of this specification and wherein like symbols refer to like parts wherever they occur, Fig. 1 is a fragmentary elevational view of one end of a three-high roll stand provided with roll neck roller bearing mountings embodying my invention, Fig. 2 is a central vertical sectional view on the line 2—2 in Fig. 1, Fig. 3 is a horizontal section on the line 3—3 in Fig. 1; and Fig. 4 is a fragmentary horizontal section on the line 4—4 in Fig. 1.

In the accompanying drawings, my invention is shown embodied in a three-high rolling mill stand comprising rolls A arranged one above another with their reduced neck portion 1 journaled in roller bearings B enclosed in similarly arranged boxes C located in a window 2 provided therefor in one of said roll housings D of the roll stand. In accordance with common practice, the bearing boxes C are made vertically adjustable by means of vertical screws 3 that bear respectively against the top and bottom bearing boxes; and each roll neck 1 terminates outwardly beyond its bearing box C in wabbler teeth 5 adapted for cooperating with the usual wabbler drive member (not shown).

The roller bearing B for rotatably supporting each roll neck 1 in its bearing box C is preferably a double row taper roller bearing comprising a double inner bearing member 6 having conical raceways 7 that taper outwardly, a circular series of conical rollers 8 for each raceway, cages 9 for said rollers and a separate conical cup or outer raceway member 10 for each series of rollers mounted in and forming part of said bearing box. The outer raceway members 10 are hardened and of relatively thin uniform section and are held in conical seats 11 provided therefor

2 in said box by a spacing ring 12 mounted in an annular groove 13 therein at the adjacent ends of said seats and by annular shoulders 14 at the remote ends thereof. The spacing ring 12 has a notch 15 in the inner periphery thereof; and lubricant passageways 16 lead from opposite ends of the bearing box C and open into said notch through the side walls of the ring receiving groove 13 for supplying lubricant to the bearing B.

Mounted on each roll neck between the inner end of the double bearing cone 6 thereon and the annular shoulder 17 formed by said roll neck is a spacing ring 18 whose cone engaging end 19 is of reduced diameter and is preferably provided with a series of circumferentially spaced notches having hardened steel wear pieces or inserts 20 therein. A similar spacing ring 21 is mounted on the roll neck 1 in abutting relation to the other end of the bearing cone 6 and is non-rotatably secured to said roll neck by means of a key 22. This spacing ring also has its cone engaging end 23 reduced and provided with a series of circumferentially spaced notches with hardened steel wear plates or inserts 23a therein. The bearing cone 6 and spacing rings 18 and 21 are held in endwise abutting relation on the roll neck 1 with the inner ring 18 seated against the annular shoulder 17 formed by said roll neck preferably by means of a locking ring 24 which is threaded on a split ring 25 seated in an annular groove 26 provided therefor in the roll neck. The locking ring 24 abuts against the outer face of the outermost spacing ring 21 and is locked thereto by means of a cap screw 27 that extends through one of a circular series of openings in said locking ring and is threaded into one of a similar series of differently spaced openings in said spacing ring. The exteriorly threaded split ring 25 is secured to the roll neck 1 for rotation therewith preferably by means of dowel pins 28.

Each end of each bearing box C is counterbored to receive an annular oil retaining or baffle plate 29 which extends across the adjacent ends of the bearing rollers 8 into close proximity to the reduced end of the spacing ring 18 or 21 adjacent thereto. A suitable oil seal 30 is mounted in the counterbore at each end of each bearing box C. The oil seals 30 in the bearing box for the middle roll are held between the annular baffle plates 29 and plates 31 that are fixed to the opposite ends of said box and have central circular openings adapted to accommodate the cone spacing rings 18 and 21. The oil seals 30 at the inner ends of the bearing boxes C for the top and bottom rolls are held between the annular baffle plates 29 and plates 31a that are secured to the inner faces of said bearing boxes and have central openings adapted to accommodate the innermost cone spacing rings 18. The oil seals 30 for the outermost ends of the bearing boxes C for the top and bottom roll necks are held between the outermost annular baffle plates 29 and plates 31b that are secured to the outer faces of said bearing boxes and have central circular openings adapted to accommodate the outermost cone spacing rings 21. The end plates 31 of the bearing box of the middle roll neck are clamped to the ends of said bearing box by a circular series of horizontal through bolts 32; and the end plates 31a and 31b of the top and bottom bearing boxes are secured thereto by a circular series of through bolts 32a.

The top and bottom bearing boxes are secured to the roll housing D on opposite sides of the window 2 therein by means of bolts 33 that extend horizontally through said roll housings and are threaded through nuts 34 non-rotatably mounted in recesses provided in the outer face of said housing. The outer end plates 31b of the upper and lower roll bearing boxes extend on opposite sides of the windows 2 of the roll housings D, and are notched, as at 35, to receive the outer ends of the bolts 33. The notched bolt receiving portions of the plates 31b are secured to the bolts 33 by means of nuts 36 threaded thereon in abutting relation to opposite side faces of said plates. The bearing box for the middle roll is secured to the roll housing D on opposite sides of the window 2 therein by means of plates 37 that are secured flatwise to the outer face of said housing by means of horizontal through bolts 38 and fit within vertical grooves 39 provided therefor in the adjacent sides of said bearing box. The bolts 38, like the bolts 33, are provided with nuts 40 that are non-rotatably mounted in recesses provided therefor in the outside face of the roll housing D and cooperate with the heads of the bolts 38 to prevent endwise movement thereof. The spacing ring 12 has its outer periphery notched, as at 41, and the through bolts 32 or 32a extend through said notches, thereby locking said ring against rotation and thus holding the lubricant notches 15 thereof in register with the lubricant supply passageways 16.

As shown in the drawings, each bearing box C is split transversely, as at 42, in the plane of the supporting groove 13 for the spacing ring 12 to provide duplicate end sections C' that are secured together by the through bolts 32 or 32a. These through bolts serve to draw the two box sections C' together and to clamp the spacing ring 12 therebetween and the outer raceway members 10 between said spacing ring and the annular abutment shoulders 14. The removal of the spacing ring 12 from the two separated bearing box sections C' permits the outer raceway members 12 to be removed endwise from the large ends of the conical seats 11 provided therefor in said sections. As shown in the drawings, the annular abutment shoulders 14 are notched, as at 43, to permit a suitable pulling implement to be hooked over the small ends of the outer raceway members 10 for withdrawing them from the conical seats 11 in separated bearing box sections.

The hereinbefore described roll neck roller bearing mounting has several important advantages. The hardened outer raceway members are relatively thin and thus permit the use of bearings of sufficient size and capacity to withstand the high rolling pressure without reducing the diameter of the roll neck. The outer raceway members fit tightly in the box sections and may be ground in place in the separated sections. The boxes with the bearings therein may be quickly and easily removed from the roll necks so as to permit replacement and substitution of different rolls. The transversely split bearing box construction and the removable spacing ring for the hardened outer raceway members thereon permit said raceway members to be quickly removed and replaced when worn or damaged. The bearing boxes for each roll are symmetrical and interchangeable from end to end thereof; and the top and bottom boxes are also interchangeable and are the only type required for a two-high roll stand.

Obviously, the hereinbefore described arrangement admits of considerable modification without departing from the invention. Therefore, I do not wish to be limited to the precise construction shown and described.

What I claim is:

1. A roller bearing mounting comprising a bearing box, a rotary member extending into said box and a double row roller bearing interposed between said box and the portion of the rotary member therein, said bearing comprising an inner bearing member mounted on said rotary member and having raceways, a series of rollers for each raceway and a separate outer raceway member for each series of rollers mounted in said box, said box having an internal annular groove therein between the adjacent ends of said outer raceway members, a spacing ring mounted in said groove in endwise abutting relation to said adjacent ends of said outer raceway members, said box being split transversely on a line passing through said annular groove to provide separate box sections one for each outer raceway member, whereby said outer raceway members are insertable in and removable endwise from the respective box sections when the latter are separated, and means for removably securing said box sections together with said spacing ring clamped in said annular groove between the side walls thereof.

2. A roller bearing mounting comprising a bearing box, a roll having a neck portion extending into said box and a double row roller bearing interposed between said box and said roll neck, said bearing comprising an inner bearing member mounted on said roll neck and having conical raceways that taper outwardly, a series of conical rollers for each raceway and a separate conical outer raceway member for each series of rollers mounted in said box, said box having an annular groove therein between the adjacent ends of said outer raceway members, a spacing ring mounted in said groove in endwise abutting relation to said adjacent ends of said outer raceway members, said box being split transversely on a line passing through said annular groove to provide endwise separable box sections one for each outer raceway member, whereby said outer raceway members are insertable in and removable endwise from the respective box sections when the latter are separated, and bolts for removably securing said box sections together endwise with said spacing ring clamped in said annular groove between the side walls thereof.

3. A roller bearing mounting comprising a bearing box, a roll having a neck portion extending into said box and a double row roller bearing interposed between said box and said roll neck, said bearing comprising an inner bearing member mounted on said roll neck and having conical raceways that taper outwardly, a series of conical rollers for each raceway and a separate conical outer raceway member for each series of rollers mounted in said box, said box having an annular groove therein between the adjacent ends of said outer raceway members and a spacing ring mounted in said groove in endwise abutting relation to said adjacent ends of said outer raceway members, said box being split transversely on a line passing through said annular groove to provide separate box sections one for each outer raceway member, whereby said outer raceway members are insertable in and removable endwise from the respective box sections when the latter are separated, said spacing ring having a notch in the inner periphery thereof and said box sections having lubricant supply passageways therein opening into said notch.

4. A roller bearing mounting comprising a bearing box, a roll having a neck portion extending into said box and a double row roller bearing interposed between said box and said roll neck, said bearing comprising an inner bearing member mounted on said roll neck and having conical raceways that taper outwardly, a series of conical rollers for each raceway and a separate conical outer raceway member for each series of rollers mounted in said box, said box having an annnular groove therein between the adjacent ends of said outer raceway members and a spacing ring mounted in said groove in endwise abutting relation to said adjacent ends of said outer raceway members, said box being split transversely on a line passing through said annular groove to provide separate box sections one for each outer raceway member, whereby said outer raceway members are insertable in and removable endwise from the respective box sections when the latter are separated, and bolts for removably securing said box sections together with said spacing ring clamped in said annular groove between the side walls thereof.

5. A roller bearing mounting comprising a bearing box, a roll having a neck portion extending into said box and a double row roller bearing interposed between said box and said roll neck, said bearing comprising an inner bearing member mounted on said roll neck and having conical raceways that taper outwardly, a series of conical rollers for each raceway and a separate conical outer raceway member for each series of rollers mounted in said box, said box having an annnular groove therein between the adjacent ends of said outer raceway members and a spacing ring mounted in said groove in endwise abutting relation to said adjacent ends of said outer raceway members, said box being split transversely on a line passing through said annular groove to provide separate box sections one for each outer raceway member, whereby said outer raceway members are insertable in and removable endwise from the respective box sections when the latter are separated, said spacing ring having a notch in the inner periphery thereof, said box sections having lubricant supply passageways therein opening into said notch, and bolts for securing said box sections together with said spacing ring clamped in said annular groove between the side walls thereof.

6. A roller bearing mounting comprising a bearing box, a roll having a neck portion extending into said box and a double row roller bearing interposed between said box and said roll neck, said bearing comprising an inner bearing member mounted on said roll neck and having conical raceways that taper outwardly, a series of conical rollers for each raceway and a separate conical outer raceway member for each series of rollers mounted in said box, said box having an annular groove therein between the adjacent ends of said outer raceway members and a spacing ring mounted in said groove in endwise abutting relation to said adjacent ends of said outer raceway members, said box being split transversely on a line passing through said annular groove to provide separate box sections one for each outer raceway member, whereby said outer raceway members are insertable in and removable endwise from the respective box sections when the latter are separated, said spacing ring having a notch in the inner periphery thereof and said box sections having lubricant supply passageways therein opening into said notch, and bolts for securing said box sections together with said spacing ring clamped in said annular groove between the side walls thereof, said spacing ring having notches in the outer periphery thereof through which bolts extend.

7. A roller bearing mounting comprising a bearing box, a rotary member extending into said box and a double-row taper roller bearing interposed between said box and the portion of the rotary member therein, said bearing comprising an inner bearing member mounted on said rotary member and having conical raceways that taper outwardly, a series of rollers for each raceway and a separate outer raceway member for each series of rollers mounted in said box, said box being split transversely between adjacent ends of said outer raceway members to provide separable box sections, whereby said outer raceway members are insertable in and removable from said box sections when the latter are separated, bolts for securing said sections together, annular oil seals mounted in the outer ends of said sections, and retaining plates for said oil seals secured to said ends of said sections by said bolts.

8. A roller bearing mounting comprising a bearing box, a roll having a reduced neck portion at one end thereof extending into said box and a double row taper roller bearing interposed between said box and said roll neck, said bearing comprising an inner bearing member mounted on said roll neck and having conical raceways that taper outwardly, a series of conical rollers for each raceway and a separate conical outer raceway member for each series of rollers mounted in said box, said box having an annular groove therein between the adjacent ends of said outer raceway members and having annular abutment shoulders for the remote ends of both of said outer raceway members, a spacing ring mounted in said groove in endwise abutting relation to said adjacent ends of said outer raceway members, said box being split transversely on a line passing through said annular groove, thereby providing separable box sections for each of said outer raceway members, whereby said outer raceway members are insertable in and removable endwise from the respective box sections when the latter are separated, and bolts for securing said box sections together with said spacing ring clamped in said annular groove between the side walls thereof and with said outer raceway members clamped between said spacing ring and the annular abutment shoulders for their remote ends.

9. The combination set forth in claim 8 in which spacing rings are mounted on said roll neck at the ends of said inner bearing member, annular oil seals are mounted in said box around the spacing rings on said roll neck, and plates are secured by said bolts to the ends of said box for holding the oil seals therein.

10. The combination set forth in claim 8 in which spacing rings are mounted on said roll neck at the ends of said inner bearing member, annular oil seals are mounted in said box around the spacing rings on said roll neck, plates are secured by said bolts to the ends of said box for holding the oil seals therein, said box is mounted in the window of the roll housing of a rolling mill, and the plate at the outer end of said box extends on opposite sides of said window and is bolted to the outer face of said roll housing.

11. The combination set forth in claim 8 in which spacing rings are mounted on said roll neck at the ends of said inner bearing member, annular oil seals are mounted in said box around the spacing rings on said roll neck, plates are secured by said bolts to the ends of said box for holding the oil seals therein, said box is mounted in the window of the roll housing of a rolling mill and has vertical grooves in its opposite sides, and plates are secured to the outer face of said roll housing and have portions fitting in said grooves.

PAUL L. HAAGER.